United States Patent
Benard

[19]

[11] Patent Number: 5,868,353
[45] Date of Patent: Feb. 9, 1999

[54] OVERHEAD LUGGAGE COMPARTMENT SAFETY DEVICE

[76] Inventor: Patricia A. Benard, 1961 Saddleback Rd., VCH, Reno, Nev. 89511

[21] Appl. No.: 754,699

[22] Filed: Nov. 21, 1996

[51] Int. Cl.[6] .................................................. B64D 47/00
[52] U.S. Cl. ........................................ 244/118.1; 244/121
[58] Field of Search ............................ 244/118.1, 118.5, 244/121; 312/291, 297; 160/273.1, 290.1; 49/34

[56] References Cited

U.S. PATENT DOCUMENTS

| | | | |
|---|---|---|---|
| 797,652 | 8/1905 | Wilson et al. | 160/273.1 |
| 1,791,548 | 2/1931 | Zucca | 160/273.1 |
| 3,438,673 | 4/1969 | Nelson . | |
| 3,938,872 | 2/1976 | Hagerman . | |
| 4,073,452 | 2/1978 | Gosau . | |
| 4,275,942 | 6/1981 | Steidl . | |
| 4,368,937 | 1/1983 | Palombo et al. . | |
| 5,244,269 | 9/1993 | Harriehausen et al. . | |
| 5,350,093 | 9/1994 | Sheely . | |
| 5,383,628 | 1/1995 | Harriehausen et al. . | |
| 5,422,794 | 6/1995 | Drake | 244/118.1 |
| 5,441,218 | 8/1995 | Mueller et al. . | |

FOREIGN PATENT DOCUMENTS

| | | | |
|---|---|---|---|
| 348130 | 12/1989 | European Pat. Off. | 312/291 |
| 1128862 | 8/1955 | France | 312/291 |
| 3441283 | 5/1986 | Germany | 160/290.1 |

*Primary Examiner*—William Grant
*Assistant Examiner*—Tien Dinh
*Attorney, Agent, or Firm*—Ian F. Burns

[57] ABSTRACT

A safety device for luggage compartments is disclosed. The device comprises a barrier which substantially covers the opening in a luggage compartment. The barrier is attached to the luggage compartment above the opening and the barrier may be releasably fastened to the luggage compartment below the opening. When in place, the barrier is strong enough to prevent objects from falling out of the luggage compartment. The fastening means of the barrier may be released and a user can access the interior of the luggage compartment. An alternative embodiment is disclosed in which the luggage compartment comprises a slot for storing the barrier. When the barrier is not in use, the barrier may be inserted into the slot where it does not interfere with luggage. A spring means may be provided within the slot for automatically retracting the barrier. The barrier may also comprise a guide track and guide balls for keeping the barrier in its proper position when it is being withdrawn from or inserted into the slot.

17 Claims, 5 Drawing Sheets

OVERHEAD LUGGAGE COMPARTMENT SAFETY DEVICE

BACKGROUND OF THE INVENTION

1. Field of Invention

The present invention relates to a device for preventing objects and baggage from falling out of a storage compartment when the storage compartment is opened. The invention is particularly well adapted to overhead storage compartments of the type which are commonly used in modern commercial airplanes, busses, trains, and other vehicles.

2. Description of Related Art

Luggage compartments are widely used in the transportation industry for storing luggage and belongings of passengers. Some luggage compartments, especially in airplanes, are placed over passenger seats. This is usually a convenient and efficient place to store luggage. However, the location of these luggage compartments exposes passengers to potential injury. Objects stored in the luggage compartment may be stored improperly and objects may shift their position during the course of a journey. When a compartment door is opened, objects can accidentally fall out and passengers sitting below can be injured. Furthermore, objects which fall out of a luggage compartment can be broken and lost.

Despite the existence of this problem, the prior art has failed to find a suitable solution. Many devices, such as those disclosed in U.S. Pat. Nos. 4,368,937, 4,275,942, 5,244,269, 5,383,628, and 544,218, have been developed for improving the operation or storage capacity of the luggage compartments. However, these devices fail to address the problem of falling objects.

SUMMARY OF INVENTION

1. Objects of the Invention

It is an object of the present invention to provide a safety device which prevents objects from falling out of a luggage compartment.

It is another object of the present invention to provide a safety device which is specifically adapted to be used with a variety of overhead luggage compartments found in commercial passenger vehicles.

It is another object of the present invention to provide a safety device which may be retrofit to exiting luggage compartments.

It is another object of the present invention to provide a safety device which is easy to operate.

It is another object of the present invention to provide a safety device which does not interfere with the operation of the luggage compartment door.

It is another object of the present invention to provide a safety device which allows passengers to see into the luggage compartment so that they can detect objects which may fall out.

It is another object of the present invention to provide a safety device which in inexpensive to manufacture and install in a luggage compartment.

It is another object of the present invention to provide a safety device which is strong and light so that it does not add significant weight to the luggage compartment.

It is another object of the present invention to provide a safety device which covers the opening of a luggage compartment while in operation and which may be easily removed from the opening to provide users with unhindered access to the luggage compartment.

It is another object of the present invention to provide a safety device which utilizes a safety net or screen which may be stored in a slot in the luggage compartment.

It is another object of the present invention to provide a safety device which has a guide means for keeping the safety device in its proper position.

These and other objects and advantages will be apparent in the remainder of the specification and claims.

2. Brief Description of the Invention

The present invention comprises two main embodiments. The first embodiment may be added to commonly used luggage compartments without significant alteration to the compartment. The compartment must have an opening through which users may have access to the interior of the luggage compartment. This embodiment utilizes a barrier made of flexible material which substantially covers the luggage compartment opening. The barrier may be a net or a sheet of transparent plastic material. The top of the barrier is preferably attached to the inside of the luggage compartment above the opening. The bottom of the barrier is releasably fastened to an area near the bottom of the opening.

In normal operation, the barrier may be released from its bottom fastener and swung out of the opening to allow a user to insert and remove luggage and other objects. The door of the luggage compartment may include a fastening device, such as a magnet, for holding the barrier away from the opening.

The second embodiment is intended to be incorporated into the structure of a luggage compartment. It also includes a flexible barrier for substantially covering the luggage compartment opening but it is preferably stored in a slot beneath the luggage compartment. In normal operation, the user pulls the barrier upwards to cover the opening and fastens the barrier to the compartment wall with a fastening means, such as a magnetic strip.

A spring means may be provided which pulls the barrier into the slot when the fasten means is disengaged. A guide track may also be provided for receiving guide balls attached to the barrier. This guides the barrier and keeps it in proper alignment when the barrier is inserted into and withdrawn from the slot.

Figure 1:
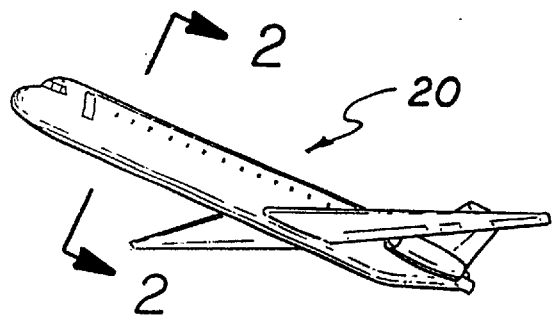
FIG. 1 is an isometric view of a commercial passenger jet which may use the present invention.

REFERENCE NUMERALS 20 aircraft
22 fuselage
24 passenger compartment floor
26 passenger seats
28 luggage compartment
30 door
32 luggage
34 openings
36 luggage compartment wall
37 luggage compartment floor
38 barrier
40 fastening means
42 bracket
44 attachment means
46 male portion
48 female portion
50 magnet
52 webbing straps
54 metal plate
56 slot
57 anchors
58 elastic cords
59 eyes
60 stop
61 pulleys
62 guide track
64 guide balls
66 magnetic strip
68 grip means
70 metal strip

DESCRIPTION OF THE PREFERRED EMBODIMENT

Figure 2:
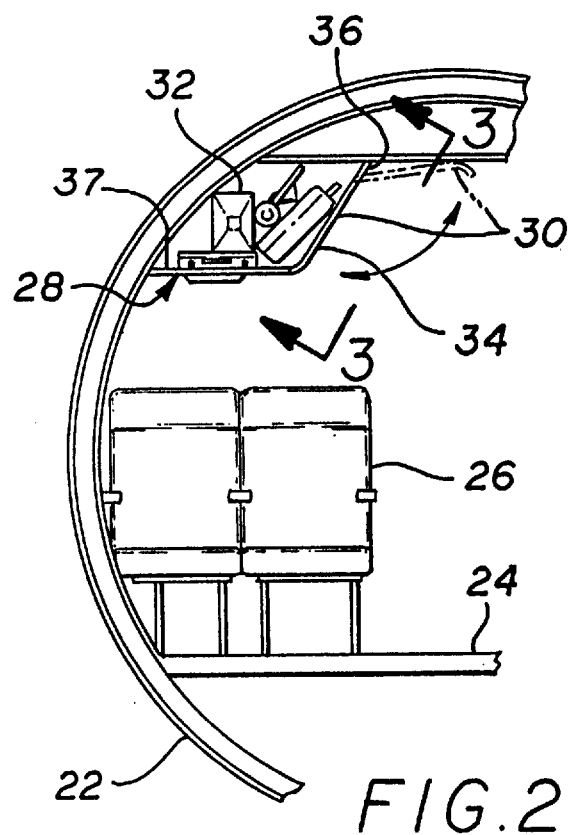
FIG. 2 is a sectional view of a passenger jet taken along line 2—2 of FIG. 1 showing an overhead passenger cargo compartment with an up-swinging door.

The present invention is intended to be used with luggage compartments, especially the type of luggage compartments found on an aircraft 20 like that shown in FIG. 1. As seen in FIG. 2, aircraft 20 has a fuselage 22 with a passenger compartment floor 24 and passenger seats 26. Luggage compartments found in aircraft are often positioned over passengers who may be seated in seats 26. A luggage compartment 28 is formed by a wall 36 which defines an interior cavity where luggage 32 is stored. Luggage compartment 28 also comprises, a luggage compartment floor 37, an opening 34, and a door 30 for covering the opening during flight. Although luggage compartment 28 is shown having door 30 with a negatively sloped outer surface when it is in a closed position, the present invention is intended to be used with many different kinds of luggage compartments, such as compartments with positively sloped doors or compartments which separate and lower from the ceiling.

Figure 4:
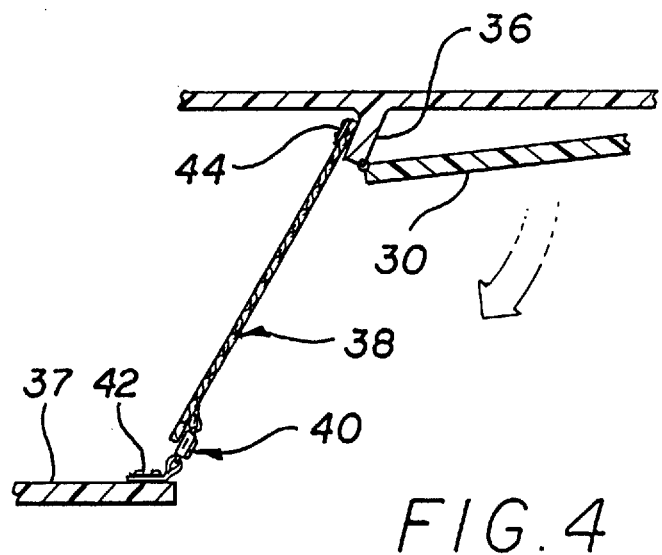
FIG. 4 is a sectional view of the present invention taken along line 4—4 of FIG. 3.
Figure 3:
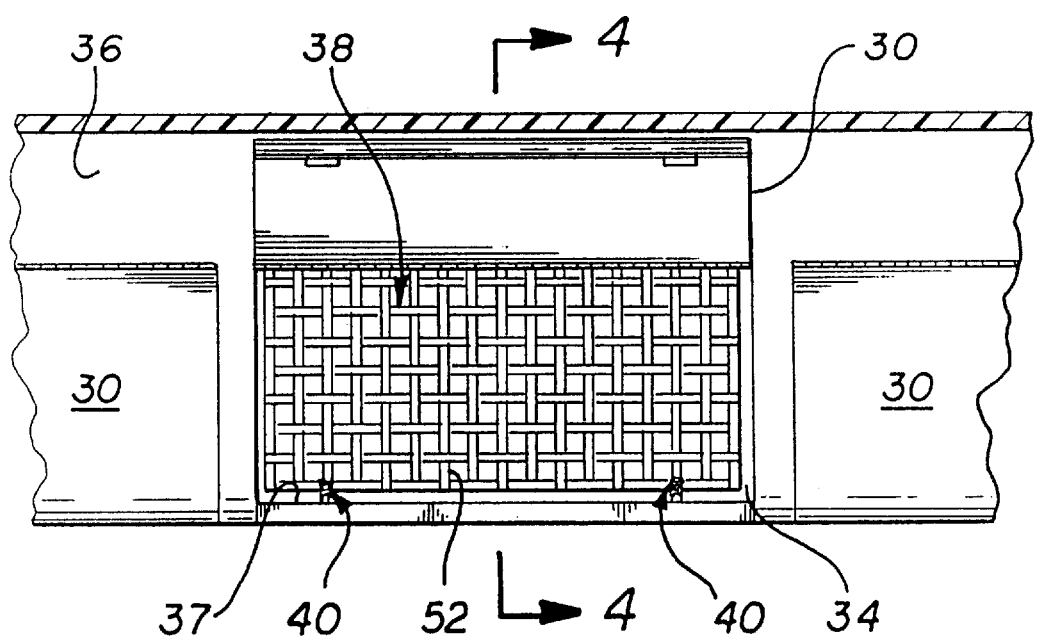
FIG. 3 is a plan view of a luggage compartment taken along line 3—3 of FIG. 2 showing one embodiment of the present invention.

As seen in FIGS. 3 and 4, the present invention comprises a barrier 38 which substantially covers opening 34. The barrier may be made of a variety of materials such as netting, plastic, or fabric. The embodiment disclosed in FIG. 3 is a net or mesh made of webbing straps 52. In the preferred embodiment, barrier 38 is at least partially transparent to allow passengers to see through barrier 38 and detect objects which may fall from luggage compartment 28.

Figure 5:
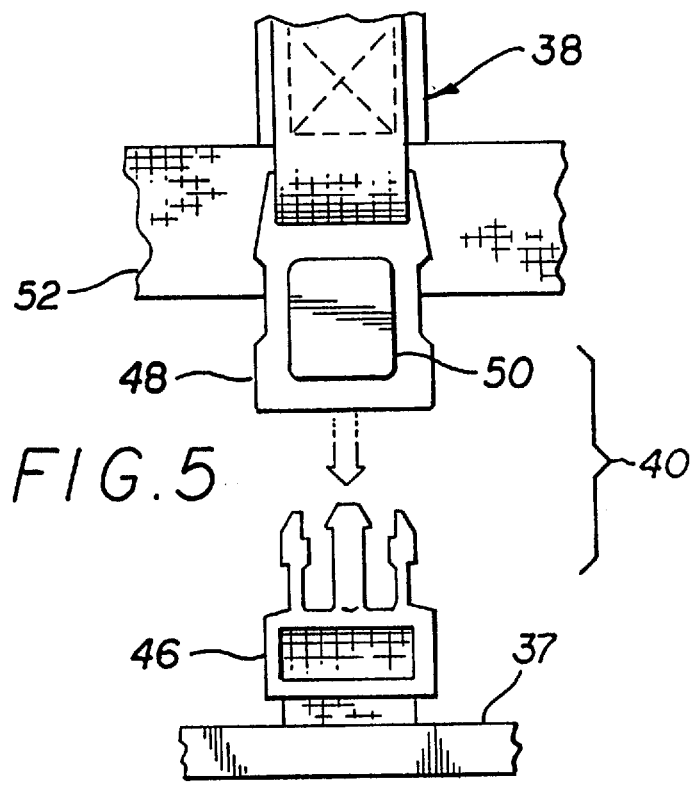
FIG. 5 is an enlarged plan view of one kind of fastening means which may be used with the present invention.

Barrier 38 is attached to wall 36 above opening 34 of the luggage compartment 28 with an attachment means 44. The lower portion of barrier 38 is attached to floor 37 of the luggage compartment 28 by a fastening means 40. Fastening means 40 may be secured to the luggage compartment floor 37 with a bracket 42. As seen in FIG. 5, the fastening means may comprise a snap buckle which includes a male portion 46 and a female portion 48. Female portion 48 may have magnet 50 for holding barrier 38 out of opening 34 (discussed below). However, many other types of fastening devices may be used.

Figure 6:
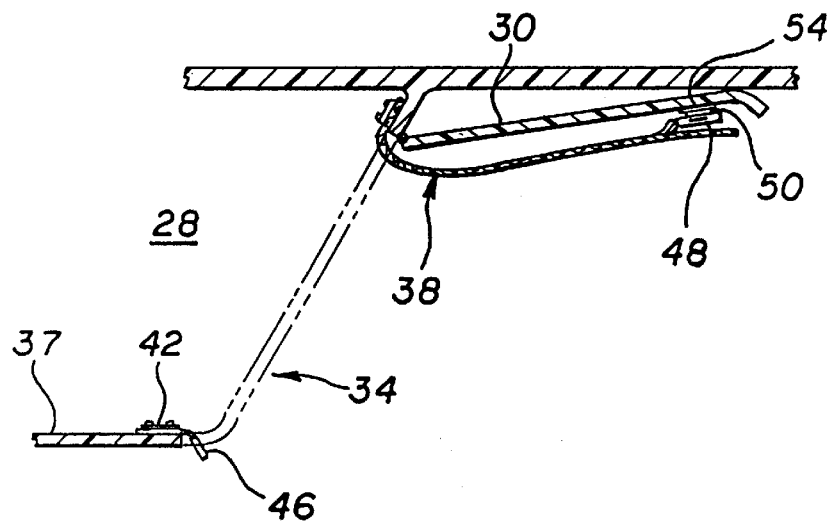
FIG. 6 is a sectional view, in a position similar to FIG. 4, showing the present invention in an open position.

As seen in FIG. 6, door 30 may comprise a metal plate 54 for receiving magnet 50 of female buckle 48. In this way, barrier 38 may be removably attached to door 30. A user can then reach into luggage compartment 28 to insert and remove luggage and belongings without being hindered by barrier 38.

Figure 7:
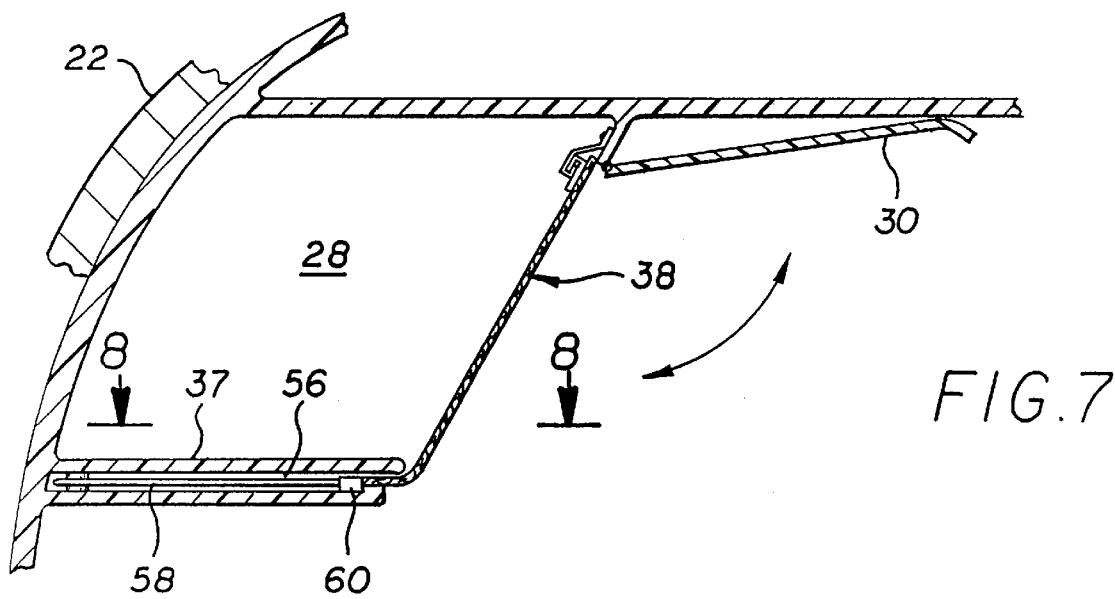
FIG. 7 is a sectional view, in a position similar to FIGS. 4 and 6, showing an alternative embodiment of present invention.

As seen in FIG. 7, an alternative fastening means may be provided for fastening barrier 38 to wall 36. This fastening means comprises interlocking hooks which are adapted to engage each other. When door 30 is closed, the hook attached to barrier 38 abuts door 30 and is prevented from disengaging the hook attached to wall 36. Although this fastening means is shown on the upper portion of barrier 36 in FIG. 7, it may also to be used on the lower portion of barrier 38.

Figure 8:
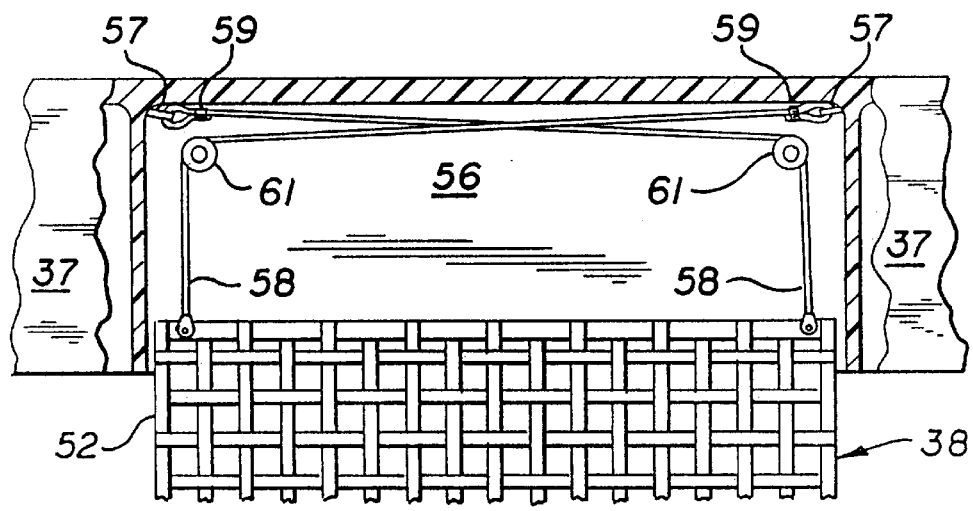
FIG. 8 is a sectional view taken along line 8—8 of FIG. 7 showing one possible spring means which may be used with the present invention.
Figure 9:
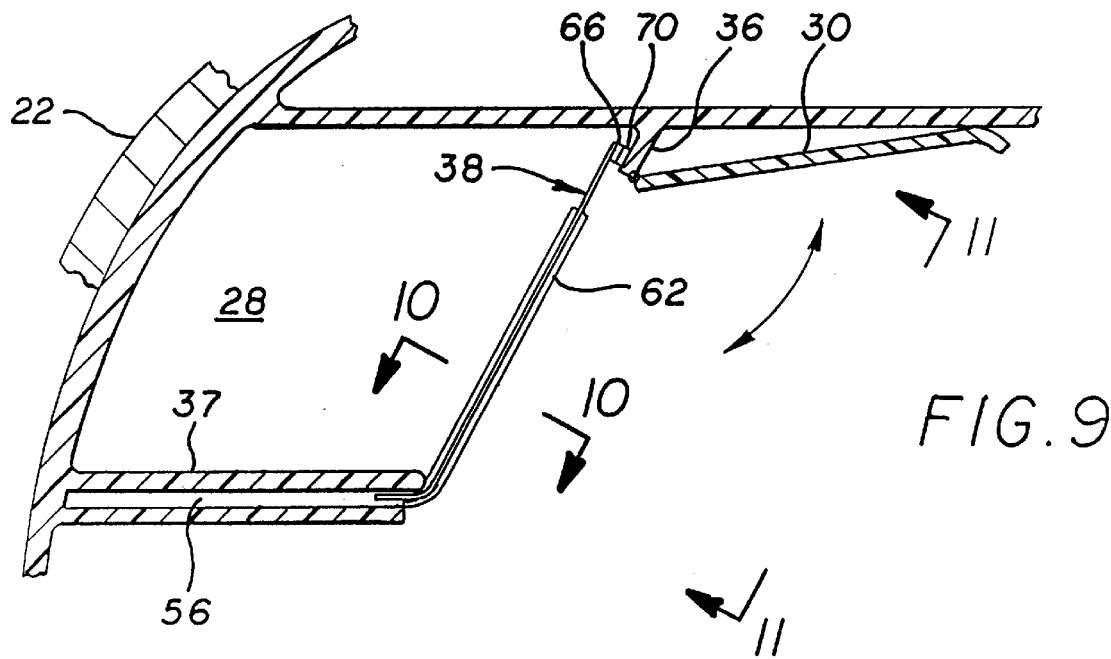
FIG. 9 is a sectional view taken in a position similar to FIGS. 4, 6, and 7.
Figure 10:
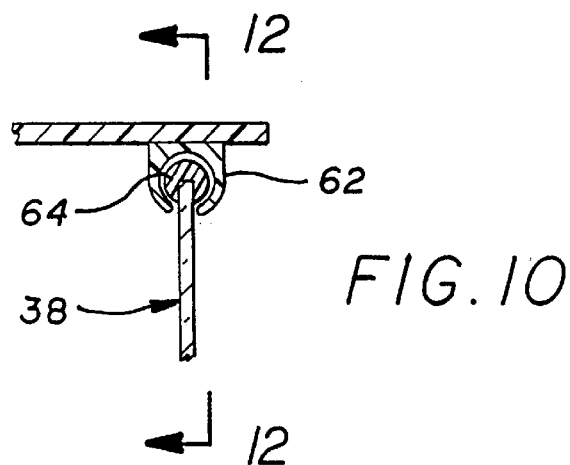
FIG. 10 is taken along line 10—10 of FIG. 9 showing the guide track of the present invention.
Figure 11:
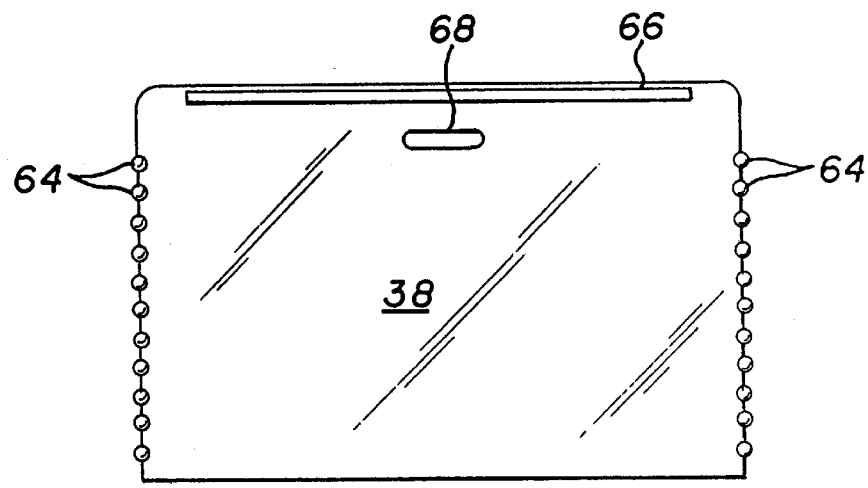
FIG. 11 is a plan view of the barrier of the present invention showing the location of guide balls.
Figure 12:
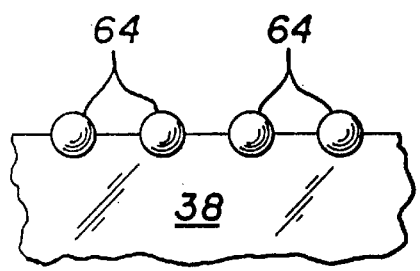
FIG. 12 is a plan view taken along line 12—12 of FIG. 10 showing the guide balls of the present invention.

As seen in FIGS. 7, 8, and 9, an alternative embodiment provides for storage of barrier 38 in a slot 56. A slot 56 is incorporated into compartment floor 37 of luggage compartment 28. A stop 60 may be provided for preventing barrier 38 from being pulled out of slot 56.

A spring means may be provided within a slot 56 for providing a retracting force on barrier 38. Spring means may take a variety of configurations. As seen in FIG. 8, spring means may comprise elastic cords 58 which are secured in slot 56 by anchors 57 and eyes 59. Pulleys 61 guide elastic cords 58 and provide a stop for barrier 38.

As seen in FIGS. 9 through 12, the present invention comprises an alternative embodiment which includes a guide means for guiding barrier 38 when it is withdrawn and inserted into slot 56. In the preferred embodiment, the guide means comprises a guide track 62 which is adapted to receive guide balls 64. Guide track 62 is located inside slot 56 and guide balls 64 are attached to or integrally formed on barrier 38. In this embodiment, barrier 38 is preferably formed of a single sheet of transparent plastic. Barrier 38 may have an attachment means for securing barrier 38 to the inter-surface of wall 36. In the preferred embodiment, the attachment means comprises a magnetic strip 66 which magnetically attaches to a metal strip 70 on wall 36. Barrier 38 may also comprise a grip means 68 for allowing a passenger to easily remove barrier 38 from slot 56 and engage the fastening means.

In normal operation, barrier 38 would be pulled from slot 56 by the user and guide track 62 and guide ball 64 would guide barrier 38 as it is withdrawn. When the user wishes to access luggage compartment 28, the user would disengage the attachment means and slide barrier 38 into slot 56.

Although the invention has been shown and described in what is conceived to be the most practical and preferred embodiment, it is recognized that departures may be made therefrom within the scope and spirit of the invention and that the invention is not limited to the details disclosed herein but is to be accorded the full scope of the claims so as to embrace any and all equivalent devices and apparatuses.

What is claimed is:

1. A storage compartment for storing objects, comprising:
   (A) a wall defining an interior cavity for holding objects,
   (B) an opening for accessing said interior cavity,
   (C) a door for covering said opening, said door opening outward from said interior cavity,
   (D) a flexible barrier for preventing objects from falling out of said interior cavity, said barrier being a shape to substantially cover said opening,
   (E) a barrier slot for storing said flexible barrier when said flexible barrier is not covering said opening,
   (F) a releasable fastening means for fastening said barrier to said wall, whereby said barrier substantially covers said opening when said fastening means is engaged,
   whereby objects within said interior cavity are held in said interior cavity by said barrier when said door is open and said fastening means is engaged, whereby said fastening means may be disengaged and inserted into said barrier slot to store said barrier and allow access said interior cavity.

2. The storage compartment of claim 1 wherein said barrier is a net.

3. The storage compartment of claim 2 wherein said net comprises webbing straps.

4. The storage compartment of claim 1 wherein said barrier is a plastic sheet.

5. The storage compartment of claim 4 wherein said barrier comprises a plurality of guide balls for guiding said barrier and said barrier slot comprises a guide track for slidably receiving said guide balls, whereby said guide balls and said guide track guide said barrier when said barrier is inserted and withdrawn from said barrier slot.

6. The storage compartment of claim 1 wherein said barrier is substantially transparent, whereby a user may see into said interior cavity when said barrier is covering said opening of said storage compartment.

7. The storage compartment of claim 1 wherein said fastening means comprises a magnet.

8. The storage compartment of claim 1 wherein said fastening means comprises a hook.

9. The storage compartment of claim 1 wherein said barrier slot comprises spring means for providing a pulling force on said barrier, whereby said spring means pulls said barrier into said barrier slot when said fastening means is disengaged.

10. The storage compartment of claim 9 wherein said spring means is at least one elastic cord.

11. A compartment for storing objects and preventing objects from falling out of the compartment, comprising the following:
    (A) at least one wall defining an internal cavity;
    (B) at least one opening in said wall;
    (C) at least one door rotatably attached to said wall and positioned to cover said opening when said door is closed;
    (D) at least one flexible barrier attached to the compartment, said barrier being a shape to substantially cover said opening, said barrier comprising an end, said end being releasable attachable to said wall adjacent to said opening; and
    (E) a slot adjacent to said opening, said slot being adapted to slidably receive said barrier and store said barrier when said barrier is not covering said opening whereby said flexible barrier is stored in a substantially flat position.

12. The compartment of claim 11 further comprising a releasable attachment device attached to said end.

13. The compartment of claim 11 wherein said barrier comprises at least one guide ball and said slot comprises at least one guide track, said guide track being adapted to slidably receive said guide ball.

14. The compartment of claim 11 further comprising a spring, said spring being adapted to pull said barrier into said slot.

15. The compartment of claim 11 wherein the barrier comprises transparent material.

16. A method of storing objects, the method comprising the following steps:
    (A) providing a compartment, the compartment having a wall defining an internal cavity, an opening, and a door;
    (B) providing a flexible barrier, the barrier being of a shape to substantially cover the opening, the barrier being releasably attachable to the wall;
    (C) providing a slot in close relative proximity to said opening, the slot being adapted to slidably receive the barrier; and
    (D) storing the barrier in the slot when the barrier is not covering the opening whereby said flexible barrier is stored in a substantially flat position.

17. The method of claim 16 further comprising the step of attaching the barrier to the wall to cover the opening.

* * * * *